(12) United States Patent
Kim et al.

(10) Patent No.: US 8,582,613 B1
(45) Date of Patent: Nov. 12, 2013

(54) LASER APPARATUS USING ANISOTROPIC CRYSTALS

(75) Inventors: Guang Hoon Kim, Busan (KR); Uk Kang, Seoul (KR); Ju Hee Yang, Seoul (KR); Dae Sik Lee, Daejeon (KR); Elena Sall, Seoul (KR); Sergey Chizhov, Seoul (KR); Andrey Kulik, Seoul (KR); Vladimir Yashin, Seoul (KR)

(73) Assignee: Korea Electrotechnology Research Institute, Changwon (KR)

( * ) Notice: Subject to any disclaimer, the term of this patent is extended or adjusted under 35 U.S.C. 154(b) by 0 days.

(21) Appl. No.: 13/563,434

(22) Filed: Jul. 31, 2012

(30) Foreign Application Priority Data

Jun. 18, 2012 (KR) ........................ 10-2012-0065248

(51) Int. Cl.
*H01S 3/10* (2006.01)
(52) U.S. Cl.
USPC ................. 372/25; 372/41; 372/18; 372/75; 372/106
(58) Field of Classification Search
USPC .................. 372/25, 41, 18, 75, 106
See application file for complete search history.

(56) References Cited

U.S. PATENT DOCUMENTS

| 6,760,356 | B2 | 7/2004 | Erbert et al. | |
|---|---|---|---|---|
| 6,891,876 | B2* | 5/2005 | Sutter et al. | 372/70 |
| 7,508,847 | B2* | 3/2009 | Honninger et al. | 372/5 |
| 2003/0091078 | A1* | 5/2003 | Braun et al. | 372/41 |
| 2005/0041702 | A1* | 2/2005 | Fermann et al. | 372/25 |
| 2012/0050843 | A1 | 3/2012 | Limpert et al. | |

FOREIGN PATENT DOCUMENTS

| JP | 2000-252560 A | 9/2000 |
|---|---|---|
| JP | 2003-163394 A | 6/2003 |
| JP | 2008-277705 A | 11/2008 |
| KR | 1020060121735 A | 11/2006 |
| KR | 10-2010-0110109 A | 10/2010 |

* cited by examiner

*Primary Examiner* — Kinam Park
(74) *Attorney, Agent, or Firm* — Patent Office of Dr. Chung Park

(57) ABSTRACT

Disclosed is a laser apparatus of amplifying a laser pulse output using an anisotropic laser crystal through chirped pulse amplification. The laser apparatus includes a laser resonator. The laser resonator includes a plurality of anisotropic laser crystals, generates a shorter femtosecond pulse by widening a spectrum bandwidth through a combination of different gain spectrum distributions using the anisotropic laser crystals, and allows a laser beam to travel in axial directions with different thermal characteristics of the anisotropic layer crystals in order to reduce a thermal effect.

11 Claims, 15 Drawing Sheets

LASER APPARATUS USING ANISOTROPIC CRYSTALS

CROSS-REFERENCE TO RELATED APPLICATION

This application claims under 35 U.S.C. §119(a) the benefit of Korean Patent Application No. 10-2012-0065248 filed Jun. 18, 2012, the entire contents of which are incorporated herein by reference.

BACKGROUND (a) Technical Field

The present invention relates to a laser apparatus using anisotropic crystals. More particularly, the present invention relates to a laser apparatus using anisotropic crystals, which can achieve a femtosecond laser system pumped optically by laser diodes by improving the quality of a pulse beam while increasing a laser output power and also reducing the width of a pulse.

(b) Background Art

An ultrashort laser light source such as a femtosecond laser pulse generates an ultrashort pulse of high peak power. Also, since the average output power of the pulses is relatively high, the ultrashort laser light source is being widely used in basic science fields such as ultrahigh speed spectrochemistry, high energy physics, and XUV-wave generation as well as in various fields such as ultrafine laser processing and micro surgery.

Generally, the ultrashort laser pulse has excellent characteristics such as high peak power, wide spectrum bandwidth etc as well as the short pulse time width.

Since the ultrashort laser pulse can be applied to micro- or nano-processing of electronic components or optical components such as solar cells, optical memories, semiconductors, and flat panel displays that require a high level of precision, demands for industrial ultrashort pulse laser systems are being increasing.

In order to satisfy the above demands, conditions for applying an ultrashort laser pulse to ultrafine laser processing will be first described as follows.

First, since the laser pulse time width is considerably shorter than the electron-phonon relaxation time of a target material, thermal energy should not be transferred to the surroundings of a part to be processed during the processing. (Non-Thermal Processing)

This is called "cold ablation". For example, the electron-phonon relaxation times of aluminum, iron, and copper are 4.27 picoseconds (ps), 3.5 ps, and 57.5 ps, respectively.

In other words, when the aluminum is processed by the ultrafine laser processing, for the cold ablation, it is desirable to apply a laser pulse with a pulse time width of picosecond or less.

Accordingly, a femtosecond laser is most suitable for the ultrafine laser processing of the cold ablation.

Since the ultrashort laser pulse of the femtosecond range minimize the thermal diffusion in the process region and does not give damage to the surroundings due to residual heat, even very hard materials that are difficult to perform mechanical processing can be processed. Also, since the pulse time width is short and the pulse energy and the peak power are high, various kinds of nanometer scale superfine structure processing are possible even for the transparent materials such as glass and polymer by way of the nonlinear optical effect that is called multi-photon absorption.

Second, the target materials to be processed have ablation thresholds of about several $J/cm^2$ or more. Considering the size of the laser beam that is focused on a target part for the ablation processing, pulse energy of about 10 μJ or more is required.

Several cases of material process application require pulse energy of hundreds of μJ.

One of representative lasers having such excellent characteristics is a titanium sapphire laser.

The titanium sapphire lasers that are commercially available so far provide a pulse time width of about several to hundreds femtoseconds and a pulse energy of several mJ or several J.

However, since an expensive high-output pulse green laser such as $Nd:YVO_4$ laser has to be used as a pumping light source, it is difficult to obtain a pulse repetition rate of tens of kHz or more.

Also, the titanium sapphire laser is large in system scale and expensive, and is hard to stably maintain the pulse output, it is not easy to utilize at a production site.

On the other hand, as a diode-pumped solid-state (DPSS) laser uses a small size of light source such as a laser diode as a pumping light source, and configures the femtosecond laser with solid laser materials, the optical pumping structure is simplified. Accordingly, the size of a laser head size becomes smaller, and the laser diode of a wavelength widely used in various fields for the commercial purpose is cheap compared to its output. Also, since the price of the femtosecond laser can be reduced, there is a cost-saving effect.

Also, the solid laser has a short optical pumping distance and thus the stable laser operation is possible. Thus, the solid laser is suitable for application to industrial lasers.

Recently, as a laser diode array and a laser diode bar which are very small but very efficient and are of stable and high power due to advancement of the semiconductor and electronic engineering are being developed, the solid laser system using diode pumping is being rapidly developed.

In order to realize the femtosecond laser system where the optical pumping is conducted using the laser diode, it is essential to select laser materials or laser crystals complying with requirements and then design and manufacture an optical pumping module for the effective optical pumping.

As a main laser material for the diode pumping, crystals doped with rare-earth ions such as neodymium (Nd) and ytterbium (Yb) which can be pumped with a laser diode of 808 nm and 980 nm range are being widely used.

At the initial stage of the development of the high output lasers, laser crystals doped with Nd have been preferred because they have a 4-level structure and various absorption lines. However, in recent years, crystals doped with Yb, which have a simpler energy level, are being widely used by showing more excellent thermal and optical characteristics.

Widely-used laser materials among materials doped with Yb are divided into non-crystal materials and crystal materials according to the form of the mother material. The crystal materials are divided into isotropic crystals and anisotropic crystals such as uniaxial crystals and biaxial crystals.

Examples of non-crystal materials include Yb:glass, and examples of isotropic crystals include Yb:YAG, Yb:ScO, Yb:YO, Yb:LuO, Yb:LuScO, and Yb:CaF. Examples of uniaxial crystals include Yb:CALGO, $Yb:YVO_4$, Yb:NGW, Yb:NYW, Yb:LuVO, Yb:LSB, Yb:S-FAP, and Yb:C-FAP, and examples of biaxial crystals include Yb:KYW, Yb:KGW, Yb:KLuW, and Yb:YCOB.

Among these, the monoclinic double tungstates such as Yb:KYW, Yb:KGW and Yb:KLuW doped with Yb can generate a high pulse energy and a high average output due to the excellent laser characteristics and thermal-mechanical characteristics, and thus has sufficient conditions to be used as a femtosecond laser material.

Particularly, Yb: KYW or Yb:KGW laser crystal has similar characteristics and has large emission and absorption cross-sections and a large emission bandwidth among the crystals doped with ytterbium, and thus can produce pulses of 200 femtoseconds or less. Also, since having sufficient thermal conductivity, Yb:KYW or Yb:KGW laser crystal has an advantage of producing a femtosecond laser of a high average output.

Yb:KYW or Yb:KGW is not symmetrical with respect to the rotation axis of the crystal regarding electrical, optical and mechanical characteristics, and is an anisotropic laser crystal that shows different characteristics according a specific axial direction.

Particularly, regarding the optical characteristics, since the refractive index, absorption degree and emittance with respect to the wavelength, thermal conductivity, and thermal expansion rate are different according to the axial direction of the laser crystal, when these anisotropic laser crystals are used as the laser materials, it is important to appropriately select the axial direction of the crystal.

There are additional requirements in order to apply the femtosecond laser light source to the industrial site involving ultrafine laser processing.

For example, if the pulse repetition rate of the laser is low, the laser processing takes much time, causing reduction of the productivity at production sites.

However, while the pulse repetition rate of the laser is better off being higher, there is a limitation in increasing the pulse repetition rate.

If the pulse repetition rate is too high such that the next laser pulse comes before plasma generated by the femtosecond laser pulse dissipates, the next laser pulse may be affected by the plasma existing around the target part, allowing the travelling direction of the beam or the pulse time width to change.

This is called plasma shielding.

In order to prevent the plasma shielding effect, the next laser pulse must be applied after the plasma relaxation time passes.

In other words, the pulse time interval between laser pulses needs to be longer than the plasma relaxation time. Though the plasma relaxation time varies according to materials to be processed, based on the laser pulse repetition rate, its repetition rate is about 1 MHz.

Accordingly, in order to maintain a high productivity in the production site, a femtosecond laser having a pulse repetition rate of hundreds of kHz range is required.

Also, in order to mount and operate the laser light source in the laser process system, high operational stability in which the laser operation status does not change over a long period of time as well as a compact size and a low price are required.

When a femtosecond pulse occurs for the first time at mode locking in a femtosecond oscillator, its pulse energy is very low at a level of nanojoule (nJ), and thus it is not suitable for application to the laser processing.

In order to increase the femtosecond pulse energy, the chirped pulse amplification (CPA) technology is used.

For example, by using a pulse stretcher, a pulse coming from the femtosecond oscillator is expanded in terms of time and then applied to the amplifier to amplify the pulse energy.

Then, the amplified pulse is allowed to pass through a pulse compressor to return the time width of the pulse to the original femtosecond range.

In this case, the pulses coming from the femtosecond oscillator serve as seeding pulses applied to the amplifier.

The temporal expansion of the pulse due to a path difference according to the wavelength in the pulse stretcher is called chirping, and the amplifying technology of the pulse energy through this process is called a chirped pulse amplification technology.

When using this technology, the nonlinear deformation that occurs in the temporal and spatial distribution of the laser pulse due to the self-focusing effect can be inhibited by maintaining the peak power in the resonator of the pulse amplifier at the necessary level, and also the physical damage that can be applied to the optical components constituting the system can also be prevented.

In other words, damage of the system due to a high energy of laser pulse can be prevented, and the pulse amplifier can be effectively operated for the enhancement of the pulse energy.

Recently, based on the chirped pulse amplification technology, as the high pulse energy can be obtained in a MOPA system which is a combination of a femtosecond master oscillator (MO) that is directly pumped by a diode light source and a power amplifier (PA) that is directly pumped by a diode light source, a significant advancement is being made in the development of the femtosecond laser system that has a high peak power and a high average output.

However, since the Yb-doped laser material has a 2-level energy structure or a near 3-level energy structure, the laser material has a disadvantage in that the light emitting at an optical pumping wavelength of 981 nm is absorbed back into the laser material.

In order to overcome the above limitation, a high power of high-brightness laser diode light source is focused on a very small spot in the laser crystal.

During this process, the pumping light source that is not deformed into the laser beam is transferred to the surroundings of the spot of the laser crystal in a form of thermal energy and is also transferred to the mount to which the laser crystal is coupled.

If a large amount of thermal energy is accumulated during this process, the quality of the beam is degraded due to distortion of the amplified laser beam, and the laser average output and the pulse energy are also limited.

Also, if the thermal energy accumulated in the laser crystal becomes higher than a damage threshold, physical damage such as cracks in the laser crystal or breakage of the laser crystal may occur, causing interruption of laser oscillation.

Hereinafter, the previous studies of generating or amplifying a femtosecond pulse using the plurality of Yb:KYW or Yb:KGW laser crystals will be described.

For example, U.S. Pat. No. 7,508,847 B2 discloses a method of increasing the frequency in which the laser beam passes through the gain material in the resonator by optical-pumping two anisotropic materials such as Yb:KGW.

However, the cited patent is focusing on increasing the length of the laser resonator in order to reduce the unstable phenomenon of the pulse power called a triggered mode. Also, the cited patent is merely proposing two gain material pumping configuration as one of various types of long resonators, but is not proposing any experimental examples or results.

Also, U.S. Pat. No. 6,760,356 B2 discloses a concept of amplifying a femtosecond pulse using two Yb:YAG that are isotropic crystals.

However, the greatest difference between the two cited patents and the present invention is that the two cited patents focus on amplifying the output power using only two laser materials but the present invention does not focus only on amplifying the output using anisotropic laser crystals that shows different characteristics depending on the axial direction but also on increasing the spectrum width of the output pulse, reducing the thermal effect, and thus reducing the time width of the final femtosecond laser pulse and improving the shape of the pulse beam.

More specifically, the anisotropic gain material has different optical and thermal characteristics according to the axis of the material.

Accordingly, depending on the axis of the anisotropic gain material for the pumping light source to be applied and for the laser to be oscillated, the spectrum or the thermal characteristics of the output pulse may significantly vary.

However, while the two cited patents are considering only the improving effect of the output power as the number of laser materials increases without mentioning the axis of the laser material, the present invention contains the technical spirit that can enlarge the spectrum width or offset the thermal effect by selecting different axes of the laser material or pumping differently. Accordingly, the present invention is proposing that not only the laser output power can be enhanced, but also the pulse width can be decreased or the quality of the beam can be considerably increased.

On the other hand, a study on efficient absorption of a depolarized pumping light source and adjustment of the polarization rate of the pumping light source that pumps laser materials by selecting the axis of Yb:KVW laser material is disclosed in U.S. Pat. No. 6,891,876 B2.

The cited patent focuses mainly on optical pumping of an anisotropic material. First, the cited patent is proposing a method of effectively performing optical pumping on the laser materials by selecting the axis of the anisotropic gain material and the wavelength of the pumping laser even when the depolarized pumping light source is used.

Second, the cited patent is proposing a method of giving no change to the laser output by appropriately selecting the axis of the laser materials even in the case where the wavelength of the pumping light source is unstable and adjusting the polarization rate of incident pumping laser.

The proposed method shows that when the direction of the laser materials is determined and cut so that two axes can be appropriately combined in one laser material by using the fact that the absorption spectrum is different according to the axial direction of the laser material, and the intensity of the pumping light source is adjusted according to the polarization direction, similar absorption cross-sections can be obtained in a wide wavelength range.

However, the above is advantageous in that an optical pumping part less sensitive to the instability of the polarization or wavelength of the pumping light source can be manufactured, but in order to obtain the absorption basal that is similar in the large wavelength range, optical pumping needs to be performed in the wavelength range in which the absorption cross-section of the laser material is small.

Also, since the output needs to be divided into two polarized light with one laser light source, the pumping efficiency significantly decreases, and the pumping light source that is absorbed without being converted into the laser wavelength accumulate in the laser material as thermal energy, degrading the quality of the laser beam and restricting its output.

As described above, the laser pulse energy coming from the femtosecond oscillator generally falls within several nJ range, and is too low to be applied to the femtosecond laser processing, thereby requiring an amplification process for increasing the pulse energy.

However, since the laser material has a gain profile with a basically limited width, the amplification rate differs according to the wavelength of the pulse input and the gain narrowing in which the spectrum bandwidth of the amplified pulse is narrowed occurs, causing increase of the pulse time width.

More specifically, FIG. 1 is a graph illustrating a variation of the spectrum according to the gain narrowing.

If the input pulse of spectrum like (a) of FIG. 1 is applied to the laser materials that has a gain profile of a limited width like (b), the amplification is continuously performed at the central wavelength $\lambda c$, but at the edge portion of wavelength that is away from the center, the gain is low and thus the amplification rate is smaller than that at the central wavelength.

When the laser pulse reciprocates in an amplifier resonator, the frequency of passing through the laser gain material increases, and a difference of an amplification ratio accumulates. Thus, the intensity at the edge wavelength becomes lower than that at the center wavelength.

In other words, it can be seen in a re-normalized graph of FIG. 1 that the width of the output pulse spectrum (c) is narrowed compared to the input pulse spectrum (a).

The dual tungstate laser material of the monoclinic system doped with ytterbium such as Yb:KYW and Yb:KGW has a wide emission bandwidth to the extent that the pulse of 100 fs or less can be made in the oscillator due to a large emission/absorption cross-section and large radiation bandwidth and the pulse of 200 fs or under can be generated in the amplifier.

However, due to the gain narrowing that occurs in the amplification process, the time width of the amplified femtosecond laser pulse stays at 300 fs to 400 fs.

Also, since the laser crystal of the Yb:KYW or Yb:KGW has excellent thermal conductivity, there is an advantage of manufacturing a femtosecond laser of a high average output power. However, since the anisotropic laser materials of Yb:KYW or Yb:KGW have different thermal conductivities, when the average output of the laser increases, the astigmatism of the thermal lenses may occur due to the thermal effect. Accordingly, if the shape of the laser beam is distorted, then the quality of the beam may be reduced.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention relates to a laser apparatus using an anisotropic crystal, which can shorten the time width of a final pulse emitting from a laser system and increase the beam quality, the average output, and the pulse energy by including a laser resonator in which the bandwidth of a gain spectrum is widened and a thermal effect is offset using a plurality of anisotropic laser crystals and inhibiting gain narrowing generated in a process of amplification.

In one aspect, the present invention provides a laser apparatus of amplifying a laser pulse output using anisotropic laser crystals through chirped pulse amplification, including: a laser resonator including a plurality of anisotropic laser crystals, generating a shorter femtosecond pulse by widening a spectrum bandwidth through a combination of different gain spectrum distributions using the anisotropic laser crystal, and allowing a laser beam to travel in axial directions with different thermal characteristics of the anisotropic laser crystals in order to reduce a thermal effect.

In an exemplary embodiment, the anisotropic laser crystal may be a biaxial crystal selected from the group consisting of Yb:KYW, Yb:KGW, Yb:KLuW, Yb:YCOB, and a combination thereof.

In another exemplary embodiment, the combination of the different gain spectrum distributions may be performed by combining one Ng-cut that is cut in an Ng-axial direction and another Np-cut that is cut in an Np-axial direction among the plurality of anisotropic laser crystals.

In still another exemplary embodiment, in the plurality of anisotropic laser crystals, all polarization directions of a pumping light source may be allowed to be parallel to an Nm-axis, and one polarization direction of the laser beam may be allowed to be parallel to the Nm-axis and the other polarization direction of the laser beam may be allowed to be parallel to the Np-axis to widen a spectrum bandwidth by combining different gain spectrum distributions.

In yet another exemplary embodiment, in the plurality of anisotropic laser crystals, all polarization directions of a pumping light source may be allowed to be parallel to the Nm-axis, and all polarization directions of the laser beam may be also allowed to be parallel to the Nm-axis to obtain a highest pulse output power.

In still yet another exemplary embodiment, the laser beam may be allowed to travel in different axial directions of the anisotropic laser crystals to reduce the thermal effect and partially offset an astigmatism of the laser beam being amplified.

In a further exemplary embodiment, the laser apparatus may include a spectral shaper between a pulse stretcher and a pulse amplifier. Here, a spectrum of a pulse may be shaped into a desired shape before a seeding pulse is incident to the pulse amplifier to inhibit gain narrowing generated in a process of amplifying the pulse.

In another further exemplary embodiment, the spectral shaper may be disposed outside the laser resonator.

In still another further exemplary embodiment, the spectral shaper may include a birefringent quartz plate between two polarizing plates, and may shape various types of spectrums by adjusting a rotation direction and a thickness of the birefringent quartz plate.

In yet another further exemplary embodiment, the laser apparatus may include a beam dumper between the plurality of anisotropic laser crystals to prevent deformation of the laser resonator due to the thermal effect caused by heating of a pumping light source that is not absorbed by the laser crystal.

In still yet another further exemplary embodiment, the anisotropic crystal may have a ytterbium doping concentration of about 2 at. % to about 4 at. % and a crystal size of about 3 mm to about 7 mm in length.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
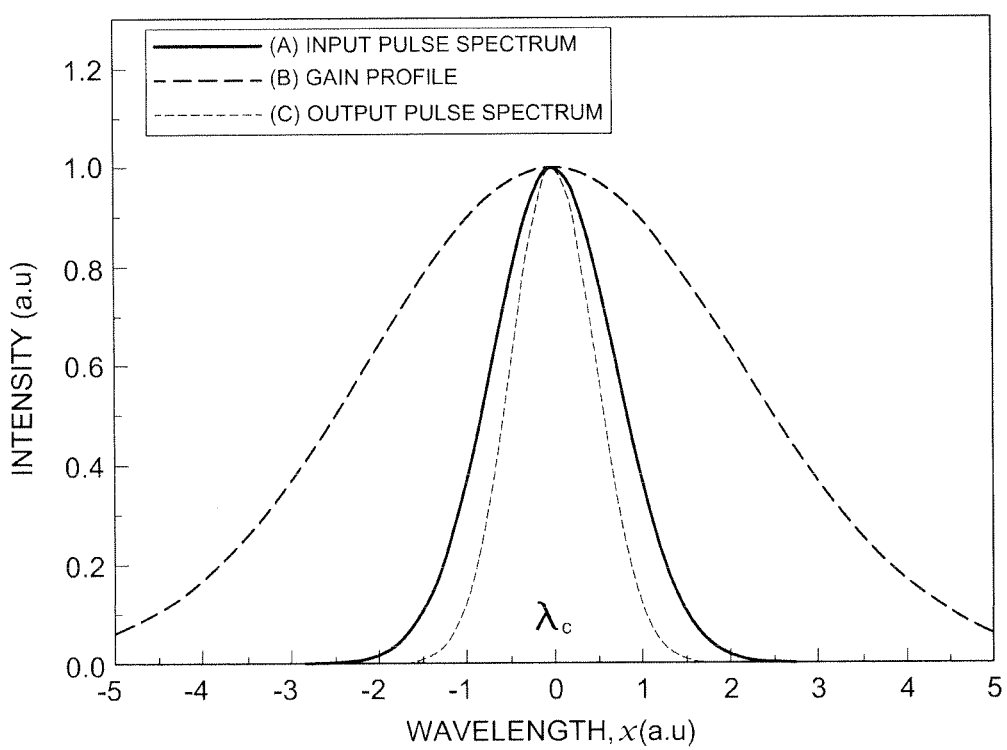
FIG. 1 is a graph illustrating a variation of a spectrum according to gain narrowing.

Reference numerals set forth in the Drawings includes reference to the following elements as further discussed below:

| | |
|---|---|
| 10: master oscillator | 11: pulse stretcher |
| 12: spectral shaper | 13: amplifier |
| 14: Faraday rotator | 15: pulse picker |
| 16: Faraday isolator | 17: pulse compressor |
| 21: laser diode | 22: optical fiber |
| 23: Pockels cell | 30: beam dumper |
| 31: cooling water passage | 32: pumping beam contact portion |
| 33: laser beam passing hole | |
| FM: total reflection mirror | TFP: thin film polarizer |
| CL: collimating lens | FL: focusing lens |
| DM: dichromatic mirror | C1, C2: laser crystal |
| CM: focusing mirror | λ/2: half-wave plate |
| λ/4: quarter-wave plate | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings.

The present invention relates to a laser apparatus using an anisotropic crystal, which can shorten the time width of a final pulse from a laser system and increase the beam quality, the average output, and the pulse energy by inhibiting gain narrowing generated in a process of amplifying the pulse energy.

Methods for widening the bandwidth of a spectrum to solve the increase of the pulse time width of a femtosecond laser in a process of amplifying pulse energy such as chirped pulse amplification are being developed.

Examples of methods for widening the bandwidth of the spectrum include spatial dispersive amplification, spectrum deformation by inserting an optical element into a resonator, and nonlinear pulse compression.

When the spectrum is deformed into a desired form before a seeding pulse is applied to an amplifier 13, or the spectrum of a laser pulse is deformed into a desire form in the amplifier 13, gain narrowing, i.e., narrowing of the spectrum generated in an amplification process can be inhibited.

Since a wide spectrum bandwidth can be maintained, an amplified laser pulse can be inhibited from being lengthened.

Figure 2:
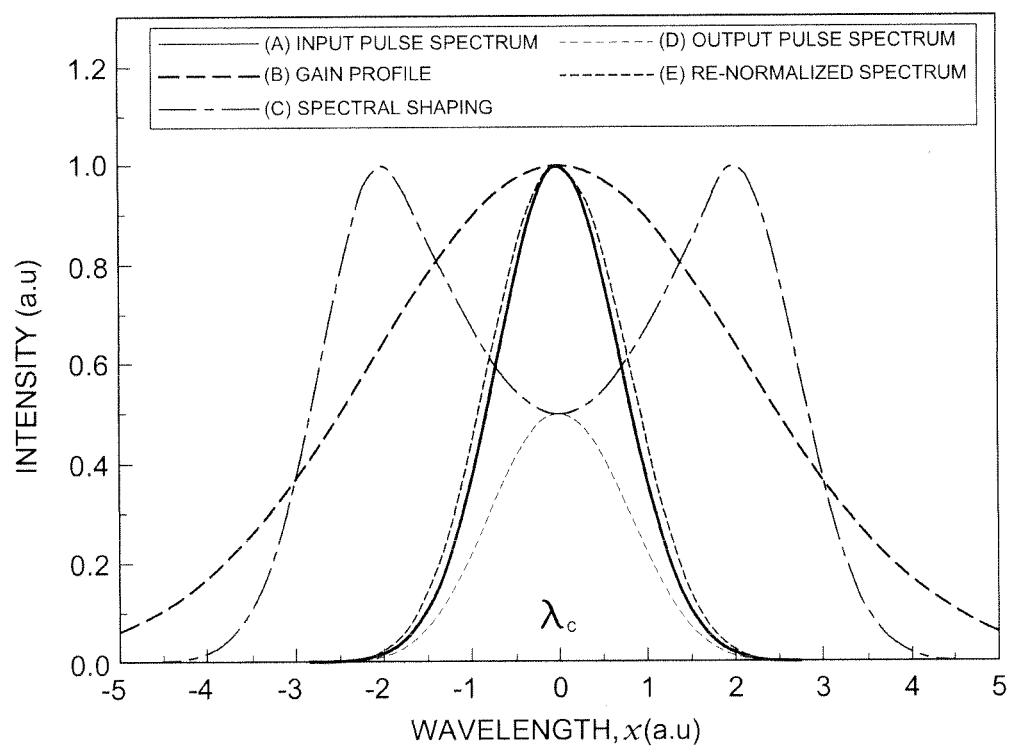
FIG. 2 is a graph illustrating a variation of a spectrum according to spectral shaping.

FIG. 2 is a graph illustrating a variation of a spectrum according to spectral shaping.

Before an input pulse with a spectrum like (a) is applied to a laser material with a gain profile of a restricted width like (b), spectral shaping having an M-shape like (c) may be performed by lowering the intensity at the central wavelength and increasing the intensity at a wavelength slightly away from the center.

When the deformed spectrum pulse is applied to the laser material with the gain profile like (b), the gain may be low at the central wavelength, and may be high at the wavelength slightly away from the center.

When the laser pulse reciprocates in the resonator of the amplifier 13, the frequency of passing the laser gain medium may increase, accumulating a difference of an amplified ratio according to the wavelength. Thus, an output pulse with an output pulse spectrum like (d) may be generated.

In a re-normalized graph of FIG. 2, it can be shown that a re-normalized spectrum (e) is widened compared to the input pulse spectrum (a).

Another promising method for inhibiting an effect of gain narrowing is to overlap the respective gain spectrums such that the gain spectrum is further widened by combining laser materials with different wavelengths of gain maximum values. Thus, the method of increasing the effective gain bandwidth can be called spectral combining compared to the spectral shaping.

An anisotropic layer crystal such as Yb:KYW or Yb:KGW may have different emission cross-sections according to the axial direction of the crystal to which the polarization direction of laser beam is parallel.

For example, in case of optical axes such as Nm, Np, and Ng in the Yb:KYW laser crystal, when the polarization direction of the laser beam is parallel to the Nm-axis of the laser crystal in a wavelength range of about 1,015 nm to about 1,050 nm, the emission cross-section may be largest. When parallel to the Np-axis, the emission cross-section may be second-largest. Finally, when parallel to the Ng-axis, the emission cross-section may be smaller about ten times than that when parallel to the Nm-axis.

The similar effect described above can be obtained by using crystallographic axes such as a-axis, b-axis, and c-axis instead of the optical axes.

Figure 3:
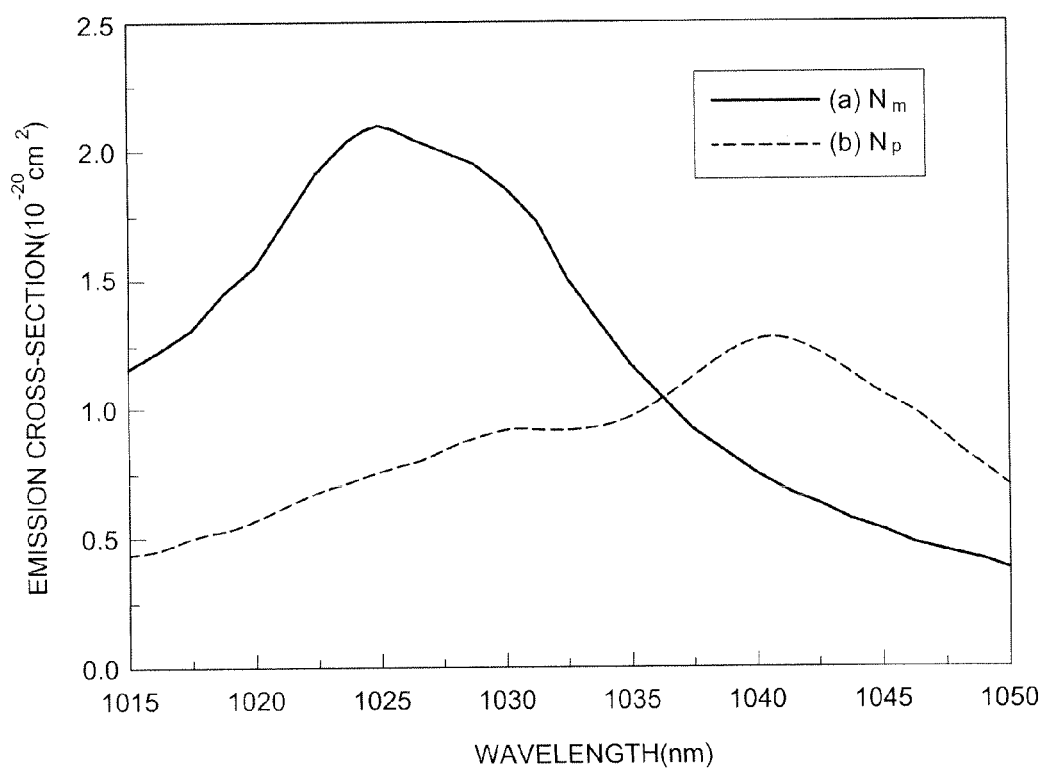
FIG. 3 is a graph illustrating emission cross-sections according to polarization directions in a laser crystal Yb:KYW.

FIG. 3 is a graph illustrating emission cross-sections with respect to the Nm-axis and the Np-axis.

Figure 4:
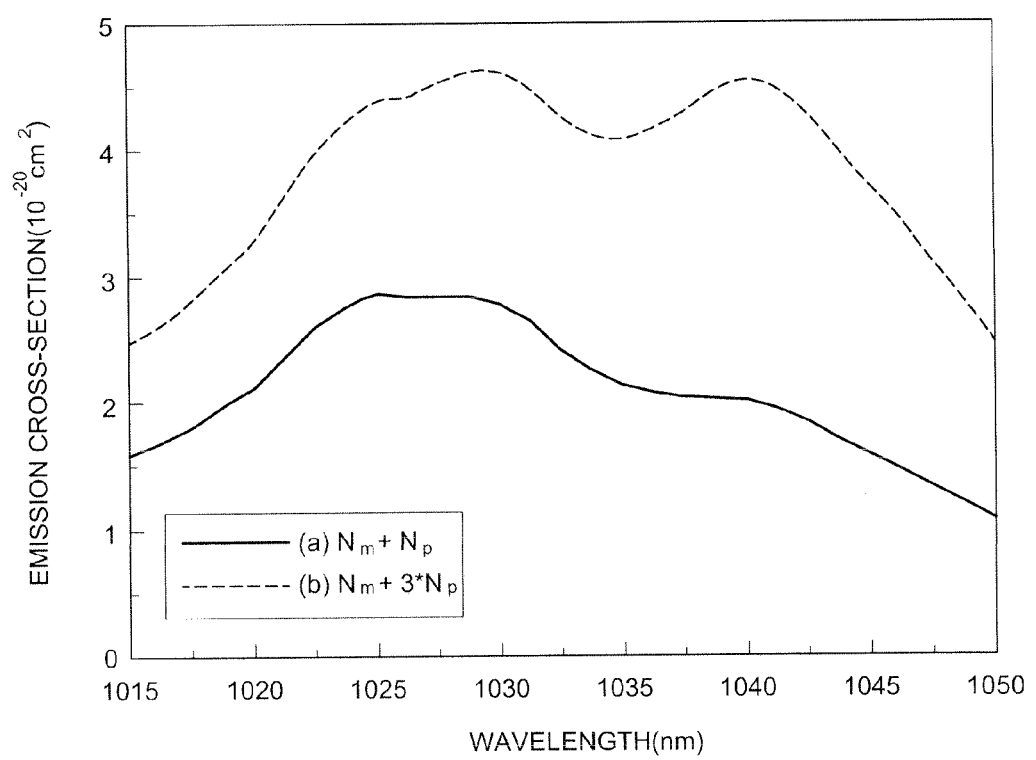
FIG. 4 is a graph illustrating a variation of an emission cross-section according to the intensity ratio of a pumping light source in a laser crystal Yb:KYW.

In case of Nm-axis, the maximum value is shown near the wavelength of about 1,025 nm like (a) of FIG. 3, and in case of Np-axis, the maximum value is shown near the wavelength of about 1,040 nm like (b) of FIG. 3. Thus, an example of combination of different gain profiles is shown in FIG. 4.

FIG. 4(a) shows a spectrum combination of Nm-axis and Np-axis with a ratio of 1 to 1, and FIG. 4(b) shows a spectrum combination with a ratio of 1 to 3.

Thus, different combination ratios can be experimentally implemented when the intensity of the pumping light source applied to the laser crystals is differentiated.

Since Yb:KYW or Yb:KGW laser has different emission cross-section and absorption cross-section according to the axial direction, the cutting direction of the crystal showing the travelling direction of the laser beam, the polarization direction of the pumping light source, and the polarization direction of the laser beam can be combined in various types.

Since the absorption cross-section of the Nm-axial direction is larger about five times than that of the Np-axial direction, it is most desirable to turn the polarization direction of the pumping light source into the Nm-axial direction in consideration of the pumping efficiency.

The absorption cross-section of the Ng-axial direction may be smaller about ten times than that of the Nm-axial direction.

Figure 5:
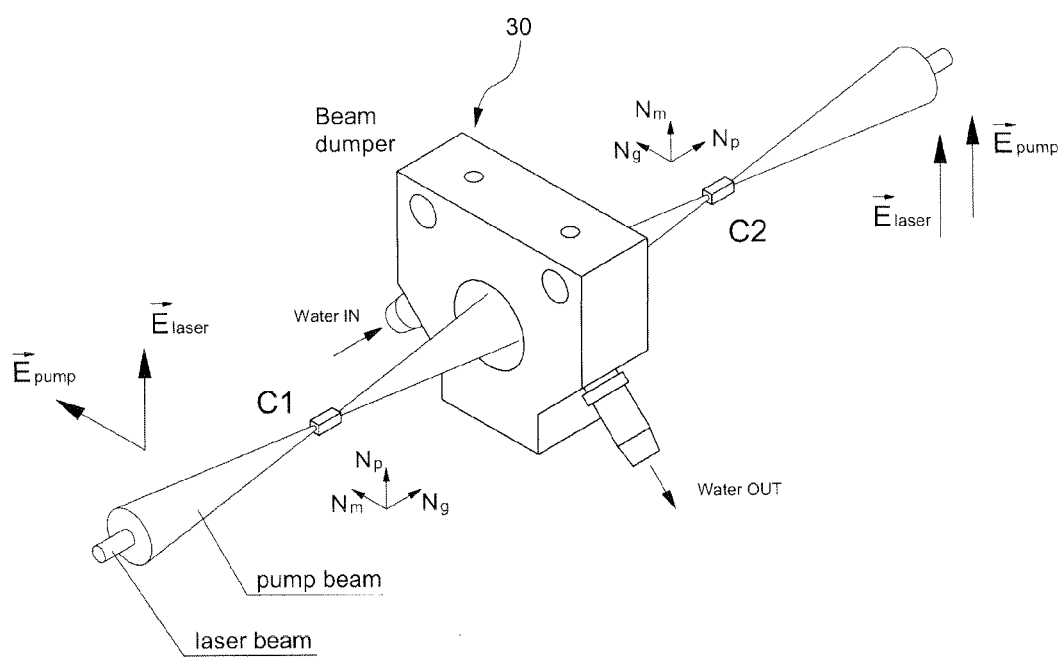
FIG. 5 is a view illustrating an exemplary combination of a pumping light source, a polarization direction of a laser, and an anisotropic Yb:KYW laser crystal.

FIG. 5 is a view illustrating an optical concept proposed to implement the spirit of the present invention described above as a combination of the polarization directions of the pumping light source and the laser, and the anisotropic Yb:KYW laser crystal C1 and C2.

The polarization $E_{laser}$ of the laser beam resonating in the laser resonator may be vertical.

The laser crystal C1 may be an Ng-cut that is cut to the Ng-axial direction. The polarization direction $E_{pump}$ of the pumping light source may be horizontal to the Nm-axis, but the polarization direction of the laser beam may be vertically disposed so as to be parallel to the Np-axis.

The laser crystal C2 may be an Np-cut that is cut to the Np-axial direction. The polarization direction of the pumping light source may be vertical so as to be parallel to the Nm-axis, and the polarization direction of the laser beam may also be vertically disposed so as to be parallel to the Nm-axis.

In other words, all the polarization directions of the pumping light source may be disposed parallel to the Nm-axis that is largest in the absorption cross-section. Also, one polarization of the laser beam may be disposed parallel to the Nm-axis that is largest in the emission cross-section, and the other polarization of the laser beam may be disposed parallel to the Np-axis to combine different gain spectrums.

That is, as a combination of the laser crystals in which one is an Ng-cut, and the other is an Np-cut, different gain spectrum distributions may be combined to widen the bandwidth thereof, generating a shorter femtosecond pulse. Also, the thermal effect may be reduced by allowing the laser beam to travel in axial directions with different thermal characteristics.

The embodiment described above can be extensively applied to a case where three or more anisotropic laser crystals are used.

A femtosecond laser with a shorter pulse time width can be applied to the industry, but embodiments are not limited thereto.

A femtosecond laser with an appropriate pulse time width and a higher average output may be needed in consideration of materials to be processed, environment of the production site, and stability of the laser system.

Figure 6:
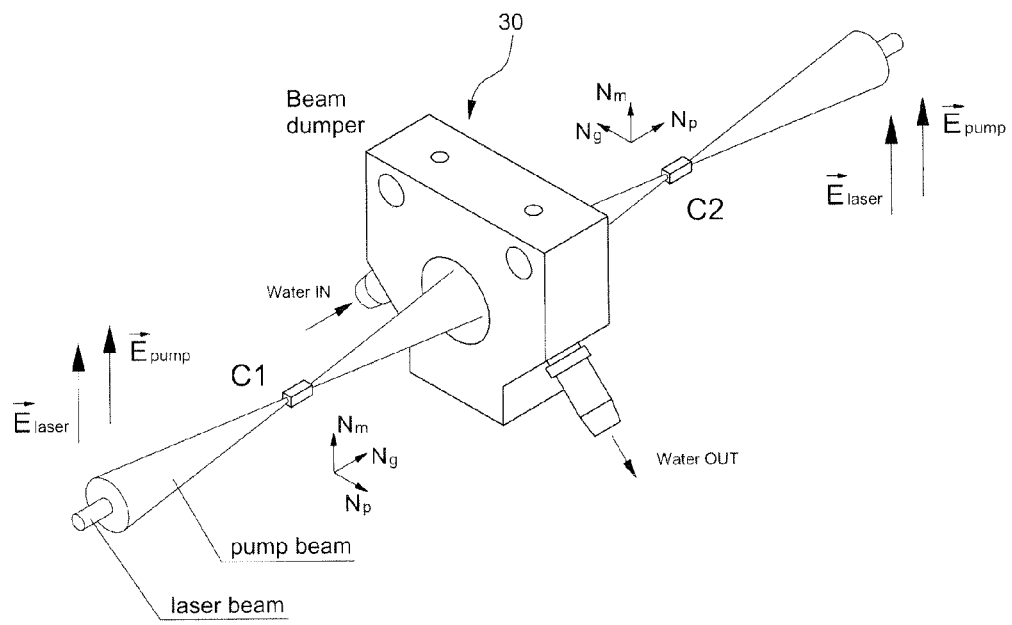
FIG. 6 is a view illustrating another exemplary combination of a pumping light source, a polarization direction of a laser, and an anisotropic Yb:KYW laser crystal.

FIG. 6 is a view illustrating another exemplary combination of a pumping light source, a polarization direction of a laser, and an anisotropic Yb:KYW laser crystal.

The polarization of the laser beam resonating in the laser resonator may be vertical.

When the laser crystal C1 is Ng-cut that is cut to the Ng-axial direction, the polarization direction of the pumping light source may be vertical so as to be parallel to the Nm-axis, and the polarization direction of the laser beam may be vertically disposed so as to be parallel to the Nm-axis.

When the laser crystal C2 is Np-cut that is cut to the Np-axial direction, the polarization direction of the pumping light source may be vertical so as to be parallel to the Nm-axis, and the polarization direction of the laser beam may also be vertically disposed so as to be parallel to the Nm-axis.

In other words, all the polarization directions of the pumping light source may be disposed parallel to the Nm-axis that is largest in the absorption cross-section, and the polarization of the laser beam may also be disposed parallel to the Nm-axis that is largest in the emission cross-section to obtain the highest output power.

Accordingly, the laser output may be increased by combining the highest gain spectrum distribution. Also, with a combination of the laser crystals in which one is an Ng-cut and other is an Np-cut, the laser beam may be allowed to travel in different axial directions, thereby reducing the thermal effect.

The embodiment described above can be extensively applied to a case where three or more anisotropic laser crystals are used.

In case of Yb:KYW or Yb:KGW laser crystal, the emission cross-section, the absorption cross-section, and thermal conductivity may vary with the axial direction.

When the average output becomes higher, thermal energy may be accumulated in the laser crystal, causing a thermal lens effect.

When the focal length of a thermal lens varies according to the axial direction, the astigmatism may occur, causing distortion of the spatial distribution of the beam.

When various types of axial directions are combined in consideration of the polarization direction of the laser beam, the polarization direction of the pumping light source, and the cutting direction of the crystal, the astigmatism needs to be together considered.

Also, when the laser resonator is configured in consideration of the ytterbium doping rate of the laser crystal and the crystal size including the length together with various types of axial directions, the thermal effect may be inhibited or may be partially offset, thereby obtaining a high quality of laser beam and also increasing the average output.

In the present invention, conventional limitations can be overcome by configuring the laser resonator in which various types of axial direction are combined in consideration of the polarization direction of the laser beam, the polarization direction of the pumping light source, and the cutting direction of the crystal, and the astigmatism and configuring a chirped pulse amplification type of femtosecond laser to which a spectrum-shaped pulse outside the resonator is applied as a seeding pulse.

In the present invention, the bandwidth of the spectrum can be widened, and the pulse time width corresponding thereto can be reduced, by combining different gain spectrums using a plurality of anisotropic laser crystals.

In the Yb:KYW anisotropic laser crystal, the Nm-axis and the Np-axis that are large in the emission cross-section may be combined to obtain a spectrum with a wide bandwidth. Also, the astigmatism can be partially offset by setting the travelling direction of the laser beam to different axial directions of the anisotropic laser crystal. Thus, a high quality of output beam can be maintained.

Also, the spectrum bandwidth of an output beam can be further widened through the spectral shaping to shorten the pulse time width while achieving a higher average output.

Figure 7:
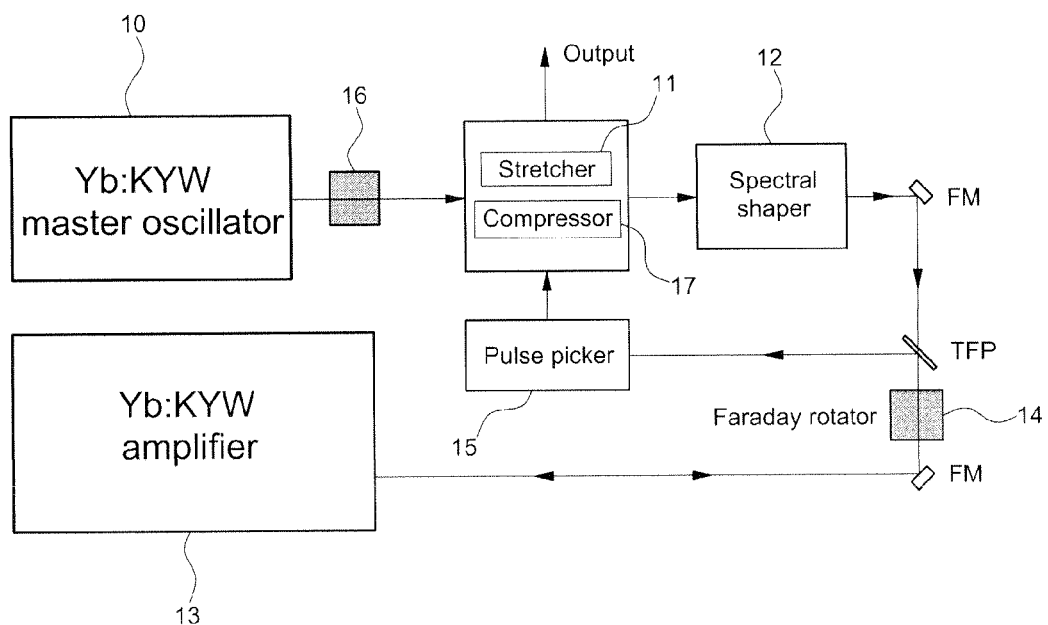
FIG. 7 is a view illustrating a femtosecond laser apparatus according to an embodiment of the present invention.

For example, the type of the femtosecond laser system experimentally implemented in the present invention is shown in FIG. 7.

In FIG. 7, FM indicates a total plane mirror, and TFP indicates a thin film polarizer.

According to the concept of the chirped pulse amplification technology, an ultrashort pulse of a femtosecond range may be generated from a master oscillator 10.

In order to prevent physical damage of optical components such as laser crystal, which may occur during the amplification process, a femtosecond pulse may be lengthened in time using a pulse stretcher 11. For example, in this test, a pulse of about 100 femtoseconds generated in an oscillator manufactured with a Yb:KYW laser crystal was lengthened several thousand times into a several tens of picosecond pulse.

A Faraday isolator 16 may be disposed between the master oscillator 10 and the pulse stretcher 11 to block a high energy of laser pulse returning back from the amplifier 13 and thus prevent damage of the master oscillator 10.

Next to the pulse stretcher 11, a spectral shaper 12 may be disposed to change the spectrum of a seeding pulse into a desire shape.

The laser pulse amplified in the amplifier 13 using the Yb:KYW laser crystal may again pass through a Faraday rotator 14 while the polarization direction rotates by about 90 degrees and then the travelling path is changed toward a pulse picker 15 by a thin film polarizer (TFP).

A desired pulse and an undesired pulse may be switched using the pulse picker 15 that is an electro-optic switch to be sent to a pulse compressor 17. Here, if the time width of the laser pulse may be restored to the femtosecond region, then a high energy of ultrashort laser pulse may be emitted out of the laser system.

Hereinafter, the present invention will be described in detail based on the following examples, but is not limited thereto.

EXAMPLES

The following examples illustrate the invention and are not intended to limit the same.

A femtosecond master oscillator 10 was manufactured to generate a seeding pulse to be applied to an amplifier 13.

In this case, the master oscillator 10 was manufactured using a Yb:KYW laser crystal with a dimension of about 3×3×2 mm$^3$ and a doping ratio of about 5 at. %.

The polarization direction of a pumping light source was disposed parallel to the Nm-axis, and the oscillation polarization direction of the laser was also disposed parallel to the Nm-axis.

The central wavelength of the femtosecond master oscillator 10 was adjusted to the central wavelength of the amplifier 13 using Np-cut in which the laser crystal is cut to the Np-axial direction.

The central wavelength of the master oscillator 10 was about 1,035 nm. The spectrum bandwidth was about 9.0 nm. The pulse time width was about 110 fs. The average output was about 1.2 W.

A pulse stretcher 11 is an apparatus that lengthens the length of the pulse in time prior to the amplifier 13. A pulse compressor 17 is an apparatus that returns the pulse time width that is lengthened to a femtosecond region.

In the chirped amplification process, when a pulse of the time width that is elongated over several hundreds or thousands times is amplified in the amplifier 13, the peak power of the amplified pulse can be reduced, and thus the physical damage of the optical components constituting the resonator of the amplifier 13 can be prevented.

Also, a nonlinear phenomenon such as a self-focusing effect generating at a high peak power may prevent the temporal shape of the pulse and the spatial distribution of the beam from being distorted.

This test was designed such that one transmission diffraction grating with a groove density of about 1,500 lines/mm can simultaneously serve as both of the pulse stretcher 11 and the pulse compressor 17.

The test using the femtosecond pulse of the master oscillator 10 was shown as follows. The femtosecond pulse with a time width of about 110 fs was stretched into a pulse of about 50 ps by the pulse stretcher 11, and was compressed into about 160 fs while passing again the pulse compressor 17.

In other words, the compression ratio of the pulse time width before the stretching and the pulse time width after the compression was about 1.45. The output conversion efficiency before and after the pulse stretcher 11 was about 74%, and the output conversion efficiency before and after the pulse compressor 17 was about 78%.

Figure 8:
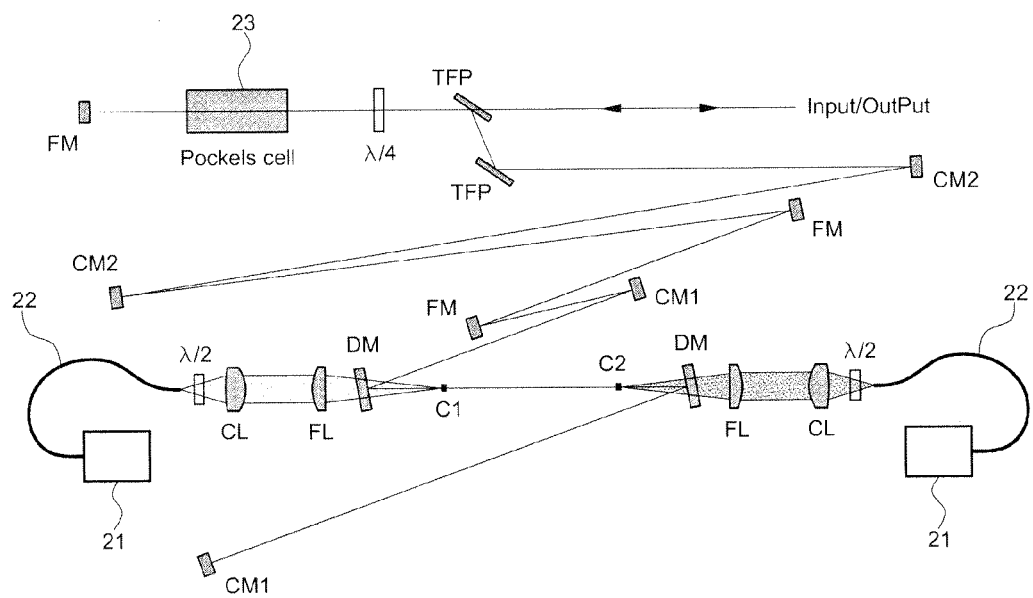
FIG. 8 is a view illustrating a regenerative amplifier using two laser crystals according to an embodiment of the present invention.

FIG. 8 is a view illustrating a laser amplifier 13 using two laser crystals in order to increase the laser output power.

In FIG. 8, FM indicates a total reflection mirror, CM1 and CM2 indicate a concave mirror with a radius curvature. The reference numerals 21 and 22 indicate a laser diode (LD bar) and an optical fiber, respectively. DM indicates a dichromatic plane mirror. FL indicates a focusing lens. CL indicates a collimating lens. C1 and C2 indicate Yb:KYW laser crystals. TFP is a thin film polarizer. $\lambda/2$ and $\lambda/4$ denote a half-wave plate and a quarter-wave plate, respectively.

Like in FIGS. 5 and 6, a beam dumper 30 may be disposed between the laser crystals C1 and C2 to cool it by water of a predetermined temperature.

In this embodiment as shown in FIG. 8, a generative amplifier 13 performing Q-switching operation was configured with two Yb:KYW laser crystals, a Pockels cell 23, a quarter wavelength plate, a thin film polarizer, and other optical components.

Here, the Pockels cell 23, the quarter wavelength plate, and the thin film polarizer may serve as a switch for emitting a pulse in the resonator to the outside.

In order to emit a laser pulse amplified in the resonator of the regenerative amplifier 13 that is optically pumped by a high-brightness laser diode 21, when a several kV of voltage is applied to the Pockels cell 23, the polarized light of the pulse may rotate by about 90 degrees and may pass through the thin film polarizer to be emitted out of the resonator.

The pulses emitted to the outside may be filtered by a pulse picker 15.

In this case, the pulse picker 15 may separate the main pulse into pre-pulses and post-pulses.

Two thin film polarizers were used in this regenerative amplifier 13 in order to increase the relative contrast ratio between a laser pulse to be emitted out of the resonator using the Pockels cell 23 and a weak laser pulse leaking out of the resonator.

In the whole system, a thin film polarizer was additionally disposed to increase the final contrast ratio.

The Yb:KYW laser crystal with a dimension of about $2\times2\times5$ mm$^3$ and a Yb$^{3+}$ ion doping concentration of about 3 at. % was used. Non-reflective coating was performed on both ends of the laser crystal regarding the pumping light source and the laser oscillation wavelength.

The dichromatic plane mirror DM was coated so as to pass a pumping light source with a wavelength range of about 981 nm at a high transmittance and reflect a 1-micro wavelength range of laser at a high reflectance.

Two pumping light sources were used for the laser crystals C1 and C2, respectively. As the pumping light source, high-brightness laser diodes 21 with a wavelength of about 981 nm and a maximum output power of about 70 W were used for the laser crystals C1 and C2.

The anisotropic laser crystal Yb:KYW used in this test shows different characteristics according to the polarization direction.

Accordingly, the length of the optical fiber 22 coupled to the laser diode 21 was minimized to maximally maintain the polarization direction of the pumping light source.

For this test, a high-brightness laser diode 21 having a length of about 30 cm, a core diameter of about 200 μm, and a numerical aperture (NA) of about 0.22 was used.

In order to allow the pumping light source to be maximally absorbed into the laser crystal, the half-wavelength plate $\lambda/2$ was disposed after the optical fiber 22. Thus, the polarized light of the pumping light source was minutely adjusted so as to be parallel to the Nm-axis of the Yb:KYW crystal.

FIG. 5 is a view illustrating an exemplary combination of a polarization direction of a pumping light source, a polarization direction of a laser, and an anisotropic Yb:KYW laser crystals C1 and C2.

A polarized light of a laser beam resonating in the resonator of the regenerative amplifier 13 was adjusted to be vertical.

The laser crystal C1 may be an Ng-cut that is cut to the Ng-axial direction. The polarization direction of the pumping light source may be horizontal to the Nm-axis, but the polarization direction of the laser beam may be vertically disposed so as to be parallel to the Np-axis.

The laser crystal C2 may be an Np-cut that is cut to the Np-axial direction. The polarization direction of the pumping light source may be vertical so as to be parallel to the Nm-axis, and the polarization direction of the laser beam may also be vertically disposed so as to be parallel to the Nm-axis.

In other words, the polarization direction of the pumping light source may be disposed parallel to the Nm-axis that is all largest in the absorption cross-section. Also, one polarization of the laser beam may be disposed parallel to the Nm-axis that is largest in the emission cross-section, and the other polarization of the laser beam may be disposed parallel to the Np-axis to combine different gain spectrums.

As a combination of the laser crystals in which one is an Ng-cut, and the other is an Np-cut, gain spectrum distributions with different laser oscillations may be combined to widen the bandwidth thereof, generating a shorter femtosecond pulse. Also, the thermal effect may be reduced by allowing the laser beam to travel in axial directions with different thermal characteristics.

The reason why the length of the laser crystal is set to about 5 mm and the doping rate is set to about 3 at. % is to reduce the thermal lens effect and improve the spatial quality of an output beam at a high power.

When using LASCAD software (Las-CAD GmbH) that can perform numerical simulation of the output characteristics by virtually configuring a resonator, the test results show that the optical intensity of a thermal-mechanical stress and the thermal lens applied to the Yb:KYW laser crystal with a length of about 5 mm and a doping rate of about 3 at. % is smaller about 1.5 times than those of the laser crystal with a length of about 3 mm and a doping rate of about 5 at. %.

The computer calculation shows that the Ng-cut crystal and the Np-cut crystal are similar to each other in the astigmatism intensity of the thermal lens, but are different from each other in the axial direction.

When the output of the pumping light source applied to the laser crystal is about 36 W, the ratio (fx/fy) of the thermal focal distance in the x-axial direction and the y-axial direction is about 1.15 in the Ng-cut, and is about 0.88.

This means that the astigmatism of an amplified beam may be partially offset when the laser beam passes through the Ng-cut crystal, and then continuously passes through the Np-cut crystal, or when the laser beam passes through the Np-cut crystal, and then continuously passes through the Ng-cut crystal.

The pumping light source that is not absorbed by the laser crystals C1 and C2 may be slight compared to the whole pumping light source, but the intensity thereof may be high enough to heat other laser crystals, optical components, and the optical mount. Accordingly, the beam dumper 30 may be disposed between the laser crystals C1 and C2 to prevent the resonator of the regenerative amplifier 13 from being deformed by the thermal effect due to the heating.

Also, a cooling water passage 31 may be formed inside the beam dumper 30 to prevent heat from transferring to the surroundings while the beam dumper 30 is being heated. Cooling water with a certain temperature was allowed to flow in the cooling water passage 31 and cool the beam dumper 30.

Figure 9:
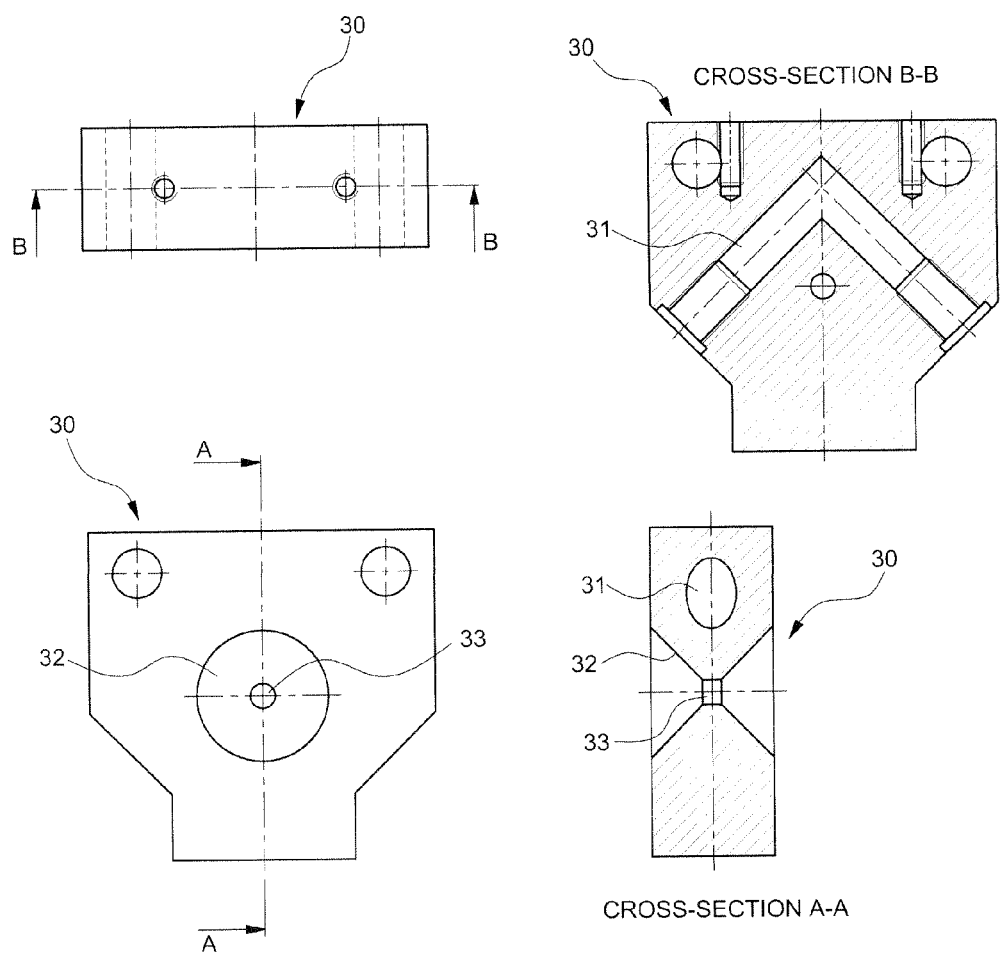
FIG. 9 is a view illustrating a beam dumper according to an embodiment of the present invention.

FIG. 9 is detail views and partially cross-sectional views of the beam dumper 30 disposed between laser crystals C1 and C2 to prevent distortion of the configuration of the resonator caused by heat.

As shown in the partially cross-sectional view taken along line A-A, a portion 32 which the pumping beam reaches has a cone shape with a large angle, which allows a reflected beam not to return to the resonator of the regenerative amplifier 13. Also, a small hole 33 may be formed in the center of the portion 32 to allow the laser beam to pass through.

As shown in the partially cross-sectional view taken along line B-B, in order to prevent the beam dumper 30 from being heated by the pumping beam that is not absorbed by the laser crystal, cooling water may flow for effective cooling.

Also, a hole and a screw tap for communicating and fixing the beam dumper 30 with other optical mount may be provided.

Hereinafter, test results will be described in detail.

Figure 10:
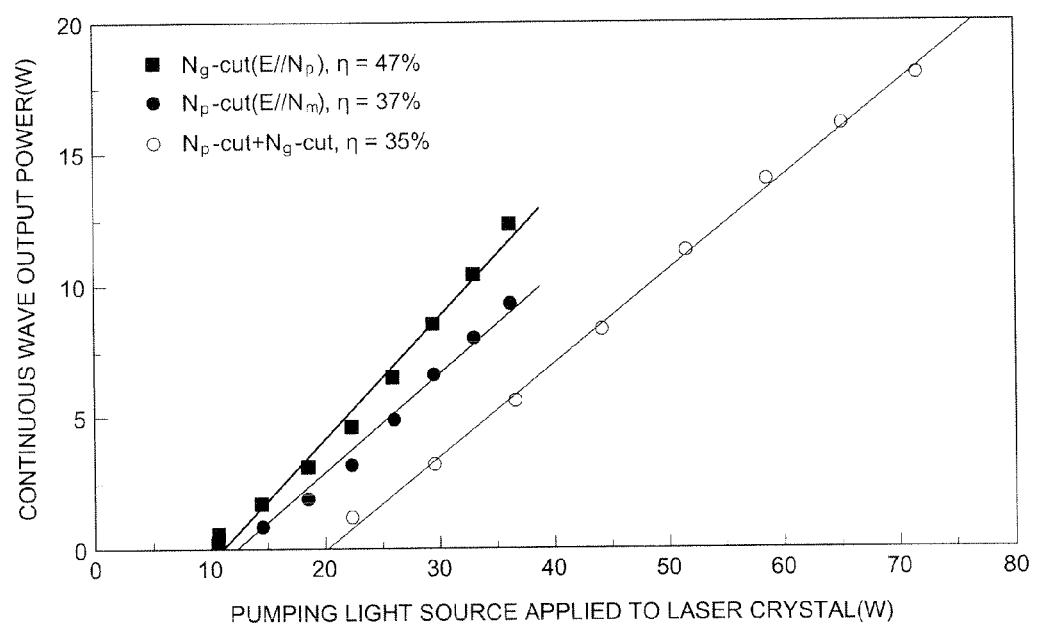
FIG. 10 is a graph illustrating a slope efficiency of a continuous wave output according to the incident power of a pumping light source applied to a laser crystal according to an embodiment of the present invention.

FIG. 10 shows operation characteristics of continuous wave (CW) output power according to the pumping power (incident pump power on crystals [W]) applied to the laser crystal in a continuous oscillation mode, not a pulse in the regenerative amplifier 13 configured as shown in FIG. 8.

First, if the pumping light source is applied to only one of the Ng-cut and Np-cut crystals, then the slope efficiency was about 47% and 37%, respectively.

When the pumping light source applied is about 36 W, the maximum output power was about 12 W and about 9 W, respectively.

If the pumping light source is applied to both of the Ng-cut and Np-cut crystals, then the slope efficiency was about 35%. When the pumping light source applied is about 72 W, the continuous wave output power of the regenerative amplifier 13 was about 18 W.

In a Q-switch mode, when the gate time is about 800 ns and the pulse repetition rate is about 200 kHz, the average output was about 16 W.

The reason why the output is slightly reduced compared to the continuous wave mode is because a loss is generated by an optical switch disposed in the resonator.

The pulse time width was about 20 ns, and the spectrum bandwidth was about 16 nm.

The M-shaped spectrum with two peaks at wavelengths of about 1,035 nm and about 1,043 nm according to different gain peaks having two laser crystals have been shown.

Spectrum narrowing may occur in a process in which pulse energy is amplified in the amplifier 13. In order to inhibit the spectrum narrowing and widen the spectrum bandwidth, a polarization-interference filter that is called a Lyot filter was used to perform the spectral shaping in the extra-cavity or the intra-cavity of the resonator.

Figure 11:
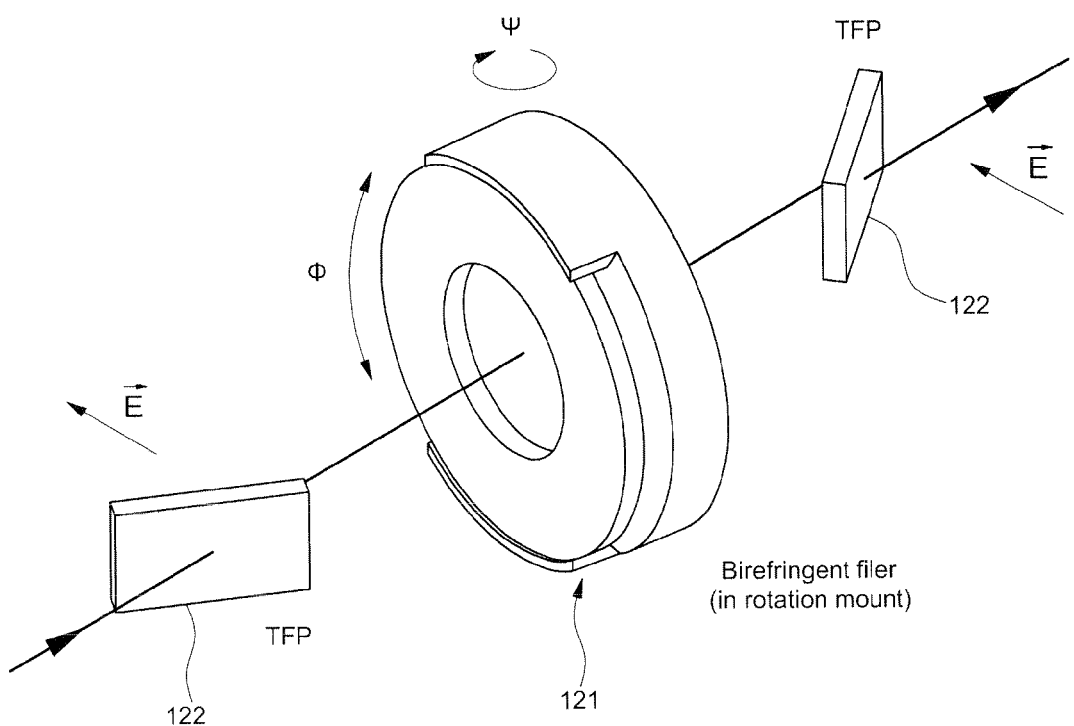
FIG. 11 is a view illustrating a spectral shaper according to an embodiment of the present invention.

The spectral shaper 12, as shown in FIG. 11, may include two polarizing plates and a birefringent quartz plate disposed therebetween.

For the optical spectral shaping, a transmittance minimum point by a birefringent filter needs to coincide with the maximum point of the gain spectrum, and the widths thereof need to be similar to each other.

For this, a quartz plate having a thickness of about 8 mm was cut according to the optical axis, and was mounted in a rotation mount in rotation direction $\phi$ and $\psi$ to minutely adjust the location of the transmittance minimum point and the modulation depth thereof.

Finally, the pulse-stretched and spectral-shaped seeding pulse was applied to the regenerative amplifier 13 to configure the whole system as shown in FIG. 7 and measure the operation characteristics thereof.

Figure 12:
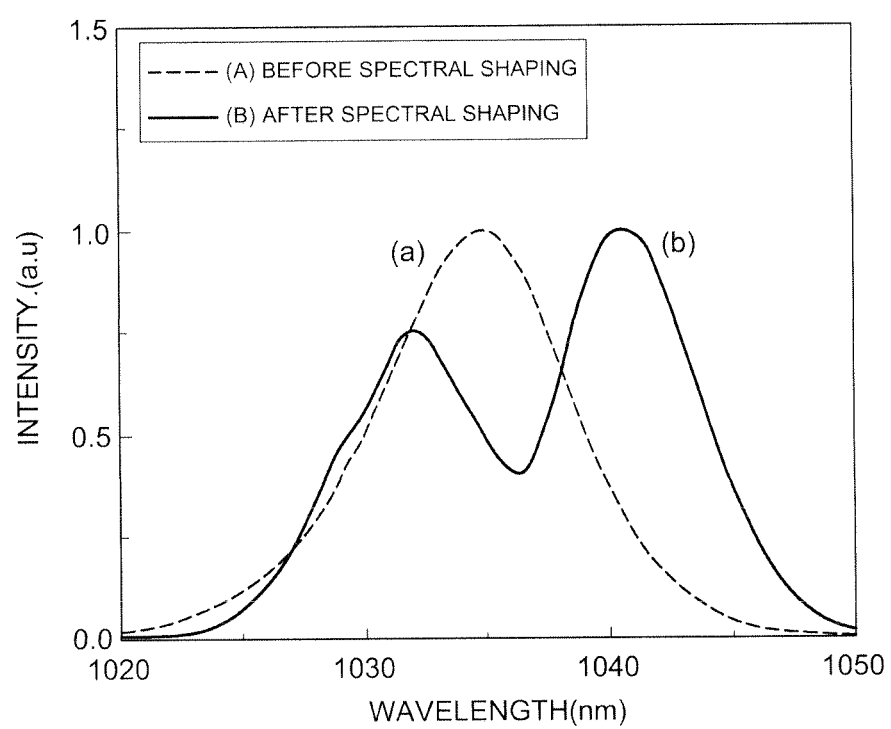
FIG. 12 is a graph illustrating spectrums before and after spectral shaping of a seeding pulse.

FIG. 12 illustrates spectrums before the spectral shaping of the pulse-stretched seeding pulse (a) and after the spectral shaping of the pulse-stretched seeding pulse (b).

The pulse emitting from the master oscillator 10 shows a symmetrical spectrum with a central wavelength of about 1,035 nm and a bandwidth of about 9 nm.

After the spectral shaping, local maximum values were shown near the wavelengths of about 1,030 nm and about 1,040 nm.

Also, the spectral shaping can be performed in various shapes by adjusting the rotation direction $\phi$ and $\psi$ the thickness of the quartz plate constituting the spectral shaper 12.

Figure 13:
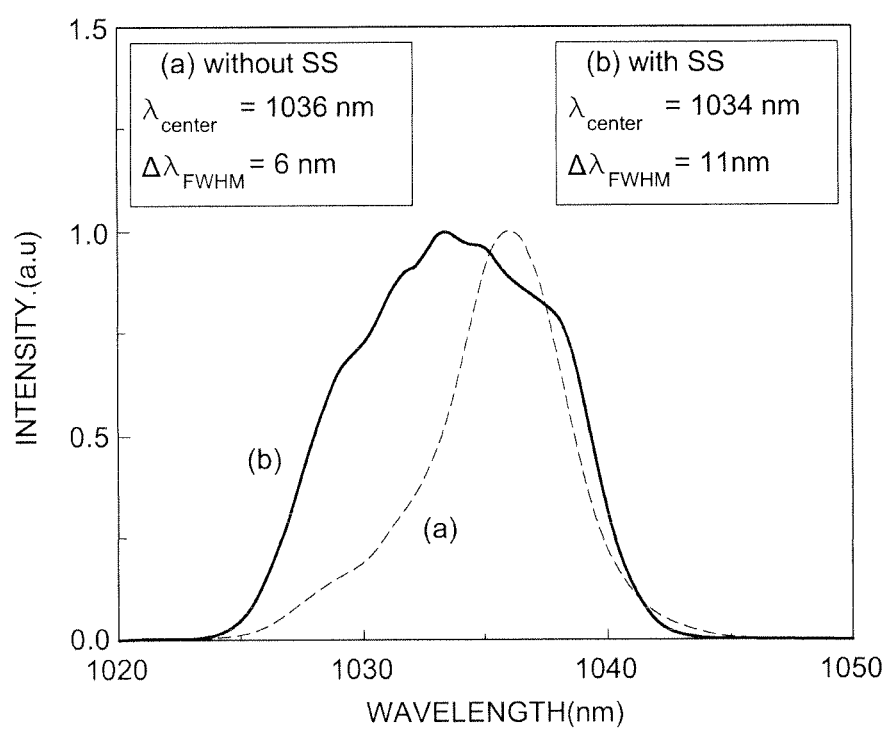
FIG. 13 is a graph illustrating spectrums of an amplified pulse without spectral shaping and an amplified pulse with spectral shaping according to an embodiment of the present invention.

FIG. 13 (a) shows an asymmetrical spectrum with a central wavelength of about 1,036 nm and a bandwidth of about 6 nm, which is measured regarding an amplified pulse when a seeding pulse without spectral shaping (SS) is applied to the regenerative amplifier 13 and the same pumping light source is applied to the laser crystals C1 and C2 at a pulse repetition rate of about 200 kHz.

When compared to (a) of FIG. 12 that is a pulse spectrum before the amplification, it can be apparent that the spectrum bandwidth was narrowed to about 9 nm to about 6 nm due to the gain narrowing.

Figure 14:
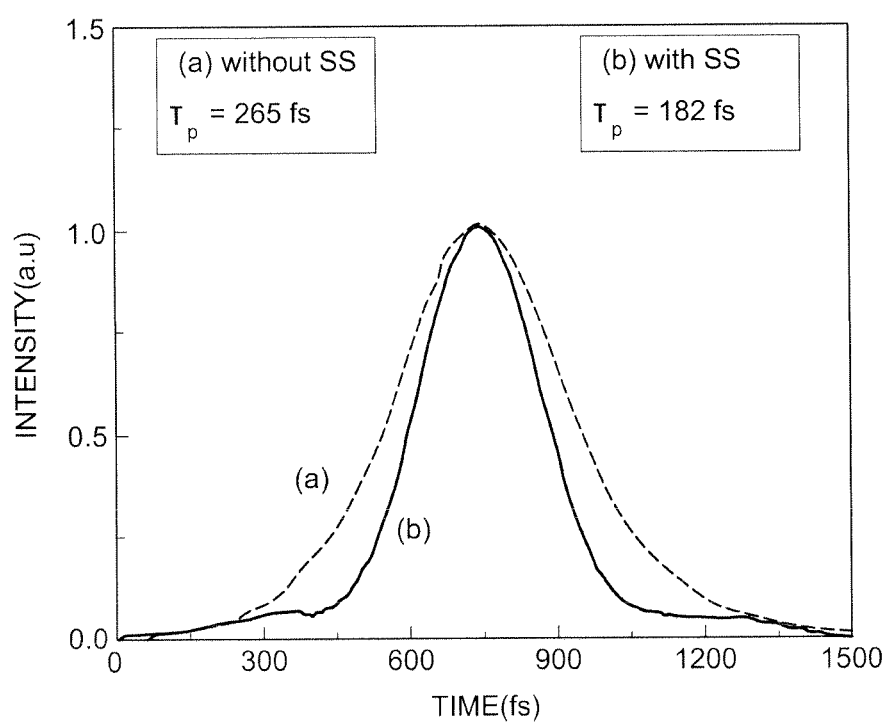
FIG. 14 is a graph illustrating pulse time widths of an amplified pulse without spectral shaping and an amplified pulse with spectral shaping according to an embodiment of the present invention.

When the narrowed spectral pulse is compressed by the pulse compressor 17, the pulse time width was measured to be about 265 fs as shown in (a) of FIG. 14.

The spectral narrowing can be inhibited by various methods.

For example, when different intensities of pumping power are applied to C1 and C2 of the anisotropic laser crystals Yb:KYW, since the gain maximum values are shown at different central wavelengths, it is possible to obtain an effect of combination of the gain spectrums with different intensities.

In the actual test, when the ratio of the pumping power applied to the Np-cut crystal and the Ng-cut crystal is change into 3:2, the spectrum was confirmed to be further widened and significantly deformed in its shape.

In this case, the spectral bandwidth and the pulse time width were measured to be about 9 nm and about 210 fs, respectively. However, although a narrowed pulse time width can be obtained from this case, the whole output power of the femtosecond laser system may be limited due to the limitation of the intensity of the pumping power.

In this test, the output was measured to be reduced by about 37% under the above conditions.

Another method of inhibiting the spectral narrowing is to use the spectral shaping. As shown in FIG. 7, the spectral shaper 12 as shown in FIG. 11 may be disposed between the pulse stretcher 11 and the regenerative amplifier 13 to perform spectral shaping on the seeding pulse outside the resonator.

The spectrum of an amplified pulse may be observed to determine an optimal location by minutely adjusting the rotation angle of the spectral shaper 12.

A spectrum of an amplified laser pulse when spectral shaping is performed on the seeding pulse is shown (b) of FIG. 13.

The measured spectrum has a bell-shape in which the central wavelength was about 1,034 nm and the spectrum bandwidth was about 11 nm.

While the bandwidth of the amplified pulse was about 6 nm before the spectral shaping, the bandwidth of the amplified pulse was increased about two times to about 11 nm after the spectral shaping. When the pulse of the spectrum widened as described above is compressed by the pulse compressor 17, the pulse time width was measured to be about 182 fs as shown in (b) of FIG. 14.

The spectral shaper 12 was disposed inside the resonator of the regenerative amplifier 13 to perform the test.

While a spectrum with a substantially equal width can be obtained, the laser output power was reduced by about 20%.

This is because a slight loss by the spectral shaper 12 including the Lyot filter is accumulated while a laser pulse is reciprocating several times inside the resonator.

Figure 15:
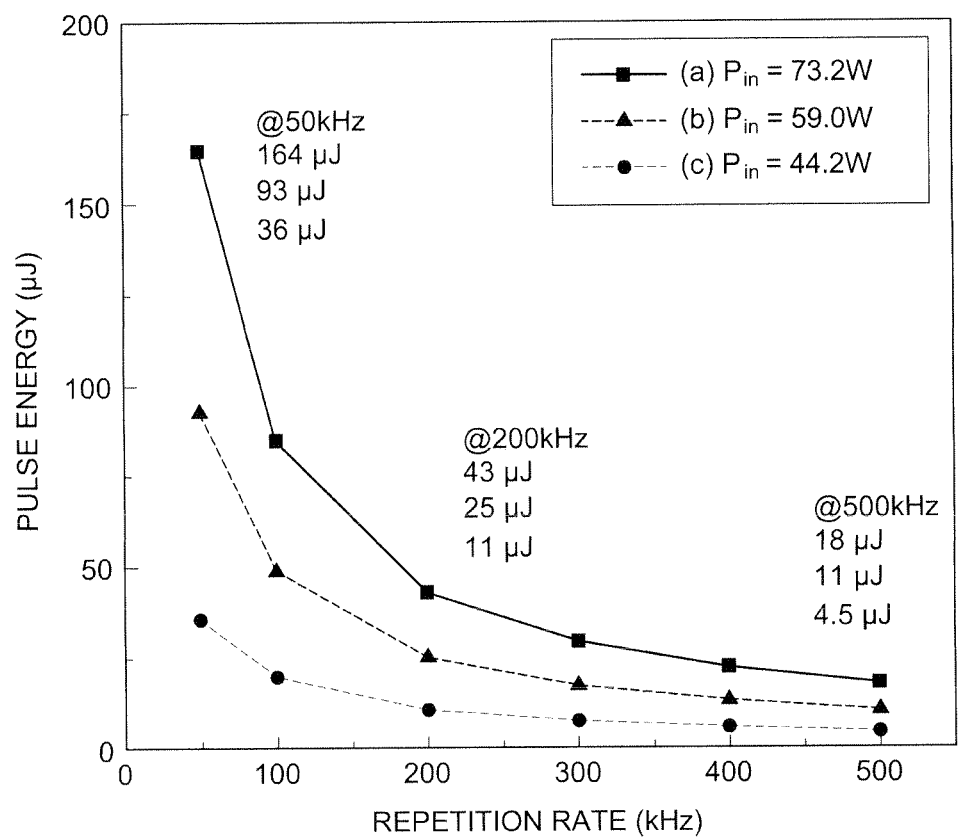
FIG. 15 is a graph illustrating a variation of pulse energy with respect to a pulse repetition rate according to an embodiment of the present invention.

FIG. 15 illustrates a variation of pulse energy according to the pulse repetition rate.

When the pulse repetition rate is lower, the pulse energy is higher. The maximum pulse energy was measured to be about 164 μJ when the pumping power applied to the laser crystal was about 73.2 W and the repetition rate was about 50 kHz.

Raman scattering was experimentally observed at a low pulse repetition rate, which may serve as a factor that interrupts significant increase of pulse energy.

Pulse energy of about 10 μJ to about 50 μJ was obtained at a pulse repetition rate of about 200 kHz, and pulse energy of about 4 μJ to about 20 μJ was obtained at a pulse repetition rate of about 500 kHz.

This level of pulse energy may be sufficient to process various samples at a high pulse repetition rate.

The test result proposed as an example of the present invention will be briefed as follows.

A femtosecond layer system that can obtain optimal values of an optical pulse time width, an average output, and a pulse energy can be achieved by configuring a laser resonator using two laser crystals with different cutting directions and configuring a combination that applies a pulse spectral-shaped outside the resonator as a seeding pulse.

A laser apparatus using a plurality of anisotropic laser crystals according to an embodiment of the present invention has the following advantages.

First, when a plurality of anisotropic laser crystals are used, a femtosecond layer with a wide spectrum bandwidth, i.e., a short pulse width can be manufactured using a laser resonator that combines various types of axial directions in consideration of the polarization direction of a laser beam, the polarization direction of a pumping light source, and the cutting direction of the crystal.

Second, a femtosecond laser with a shorter pulse width can be manufactured by widening the spectrum bandwidth using a spectrum shaper that is disposed inside or outside the laser resonator to deform the pulse spectrum into a desired shape.

Third, when the laser resonator is configured in consideration of the ytterbium doping rate of the laser crystal and the crystal size including the length together with various types of axial directions, the thermal effect can be inhibited or can be partially offset, thereby obtaining a high quality of laser beam and also increasing the average output.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A laser apparatus of amplifying a laser pulse output using an anisotropic laser crystal through chirped pulse amplification, comprising:
   a laser resonator comprising a plurality of anisotropic laser crystals, generating a shorter femtosecond pulse by widening a spectrum bandwidth through combining different gain spectrum distributions using the anisotropic laser crystal, and allowing a laser beam to travel in axial directions with different thermal characteristics of the anisotropic laser crystals in order to reduce a thermal effect.

2. The laser apparatus of claim 1, wherein the anisotropic laser crystal is a biaxial crystal selected from the group consisting of Yb:KYW, Yb:KGW, Yb:KLuW, Yb:YCOB, and a combination thereof.

3. The laser apparatus of claim 1, wherein the combination of the different gain spectrum distributions is performed by combining one Ng-cut that is cut to an Ng-axial direction and another Np-cut that is cut to an Np-axial direction among the plurality of anisotropic laser crystals.

4. The laser apparatus of claim 3, wherein in the plurality of anisotropic laser crystals, all polarization directions of a pumping light source are allowed to be parallel to an Nm-axis, and one polarization direction of the laser beam is allowed to be parallel to the Nm-axis and the other polarization direction of the laser beam is allowed to be parallel to the Np-axis to widen a spectrum bandwidth by combining different gain spectrum distributions.

5. The laser apparatus of claim 3, wherein in the plurality of anisotropic laser crystals, all polarization directions of a pumping light source are allowed to be parallel to the Nm-axis, and all polarization directions of the laser beam are also allowed to be parallel to the Nm-axis to obtain a highest pulse output power.

6. The laser apparatus of claim 3, wherein the laser beam is allowed to travel in different axial directions of the anisotropic laser crystals to reduce the thermal effect and partially offset an astigmatism of the laser beam being amplified.

7. The laser apparatus of claim 1, comprising a spectral shaper between a pulse stretcher and a pulse amplifier,
wherein a spectrum of a pulse is shaped into a desired shape before a seeding pulse is incident to the pulse amplifier to inhibit gain narrowing generated in process of amplifying the pulse.

8. The laser apparatus of claim 7, wherein the spectral shaper is disposed outside the laser resonator.

9. The laser apparatus of claim 7, wherein the spectral shaper comprises a birefringent quartz plate between two polarizing plates, and shapes various types of spectrums by adjusting a rotation direction and a thickness of the birefringent quartz plate.

10. The laser apparatus of claim 1, comprising a beam dumper between the plurality of anisotropic laser crystals to prevent deformation of the laser resonator due to the thermal effect caused by heating of a pumping light source that is not absorbed by the laser crystal.

11. The laser apparatus of claim 1, wherein the anisotropic crystal has a ytterbium doping concentration of about 2 at. % to about 4 at. % and a crystal size of about 3 mm to about 7 mm in length.

* * * * *